United States Patent
Nishina et al.

(10) Patent No.: US 7,416,511 B2
(45) Date of Patent: Aug. 26, 2008

(54) GEAR SHIFT CONTROL SYSTEM OF HYBRID VEHICLE

(75) Inventors: Mitsuhiro Nishina, Ageo (JP); Yuji Suzuki, Ageo (JP); Hideaki Gouda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 214 days.

(21) Appl. No.: 10/568,274

(22) PCT Filed: Sep. 11, 2003

(86) PCT No.: PCT/JP03/11661

§ 371 (c)(1),
(2), (4) Date: Feb. 15, 2006

(87) PCT Pub. No.: WO2005/025911

PCT Pub. Date: Mar. 24, 2005

(65) Prior Publication Data

US 2006/0293144 A1 Dec. 28, 2006

(51) Int. Cl.
*B60W 10/08* (2006.01)
(52) U.S. Cl. .............................. 477/5; 477/70; 477/77; 477/79; 477/83; 477/87; 477/171; 477/174; 477/179; 477/180
(58) Field of Classification Search .................. None
See application file for complete search history.

(56) References Cited

U.S. PATENT DOCUMENTS 5,993,350 A * 11/1999 Lawrie et al. .................. 477/5
6,645,105 B2 * 11/2003 Kima ............................. 475/5

FOREIGN PATENT DOCUMENTS

| EP | 1332907 | 8/2003 |
|---|---|---|
| JP | 61-138635 | 8/1986 |
| JP | 63-154437 | 6/1988 |
| JP | 09-089090 | 3/1997 |
| JP | 10-304513 | 11/1998 |
| JP | 2001-103603 | 4/2001 |
| WO | WO 02/36382 | 5/2002 |

* cited by examiner

*Primary Examiner*—David D. Le
(74) *Attorney, Agent, or Firm*—Rabin & Berdo, PC

(57) ABSTRACT

In a hybrid-drive electric vehicle, upon request of gear shifting of a transmission (2), a clutch (3) is first disconnected and the transmission (2) is set to a neutral position. The rotating electric generator 4 is then operated in a motor mode or a power generating mode so that a rotational speed of an input shaft of the transmission (2) reaches a region of a synchronizing rotational speed in accordance with a requested gear position. When the rotational speed of the input shaft of the transmission (2) reaches the region of the synchronizing rotational speed, the gear position of the transmission (2) is changed over from the neutral position to the requested gear position. Thus the rotation synchronizing time for the gear shifting in the transmission (2) is reduced, making it possible to perform the gear shifting for a short period of time.

5 Claims, 3 Drawing Sheets

GEAR SHIFT CONTROL SYSTEM OF HYBRID VEHICLE

TECHNICAL FIELD

The present invention relates to a vehicle which is provided with a parallel type of hybrid drive system comprising an engine and a rotating electric machine (motor/generator) as power sources of the vehicle and in particular to a gearshift control system of a transmission for the same.

BACKGROUND OF THE ART

In order to drive a vehicle, a hybrid drive system provided with an engine and a motor has been proposed by Japanese Patent Laid-Open Publications No. 10-304513 and No. 2001-103603.

In addition, it is known that a clutch is interposed between an engine and a transmission and a rotating electric machine having functions of an electric motor and an electric generator is coupled to an input side of the transmission.

In such a hybrid system, an inertia force caused by the rotating electric machine connected to an input shaft of the transmission is applied at the time of the gear shift of the transmission and therefore, synchronization of rotation needs longer time, thus increasing time required for the gear shift.

DISCLOSURE OF THE INVENTION

It is therefore an object of the present invention to reduce as much synchronization time as possible at the time of gear shifting for performing a quick gear shift.

A hybrid-drive electric vehicle according to the present invention comprises an engine, a transmission for changing and transmitting a rotation of an input shaft to wheels via an output shaft, a clutch for connecting and disconnecting power transmission between an output shaft of the engine and the input shaft of the transmission, a rotating electric machine connected to a side of the input shaft of the transmission for operating as an electric motor and an electric generator, a storage element for storing an electric power supplied from the rotating electric machine, determining means for determining whether or not a gear shifting request of the transmission exists, clutch disconnection means for disconnecting the clutch upon the gear shifting request of the transmission, neutral position setting means for changing over a gear position of the transmission to a neutral position when the clutch has disconnected, mode selecting means for selectively operating the rotating electric generator in a motor mode and in a power generating mode so that a rotational speed of the input shaft of the transmission reaches a region of a synchronizing rotational speed depending on a requested gear position, and gear setting means for setting the gear position of the transmission (2) from the neutral position to the requested gear position.

Accordingly, when a request of gear shifting occurs, the gear position is set to a neutral position once and then, the rotating electric machine operates in the motor mode or the power generating mode to realize a rotational speed of the input shaft of the transmission corresponding to the requested gear position, so that the rotational speed of the input shaft of the transmission is quickly converged to a region of the synchronizing rotational speed. As a result, at the time of the gear shifting, synchronizing time for the gear setting is reduced, allowing the quick gear shift.

BEST MODES FOR CARRYING OUT THE INVENTION

Figure 1:
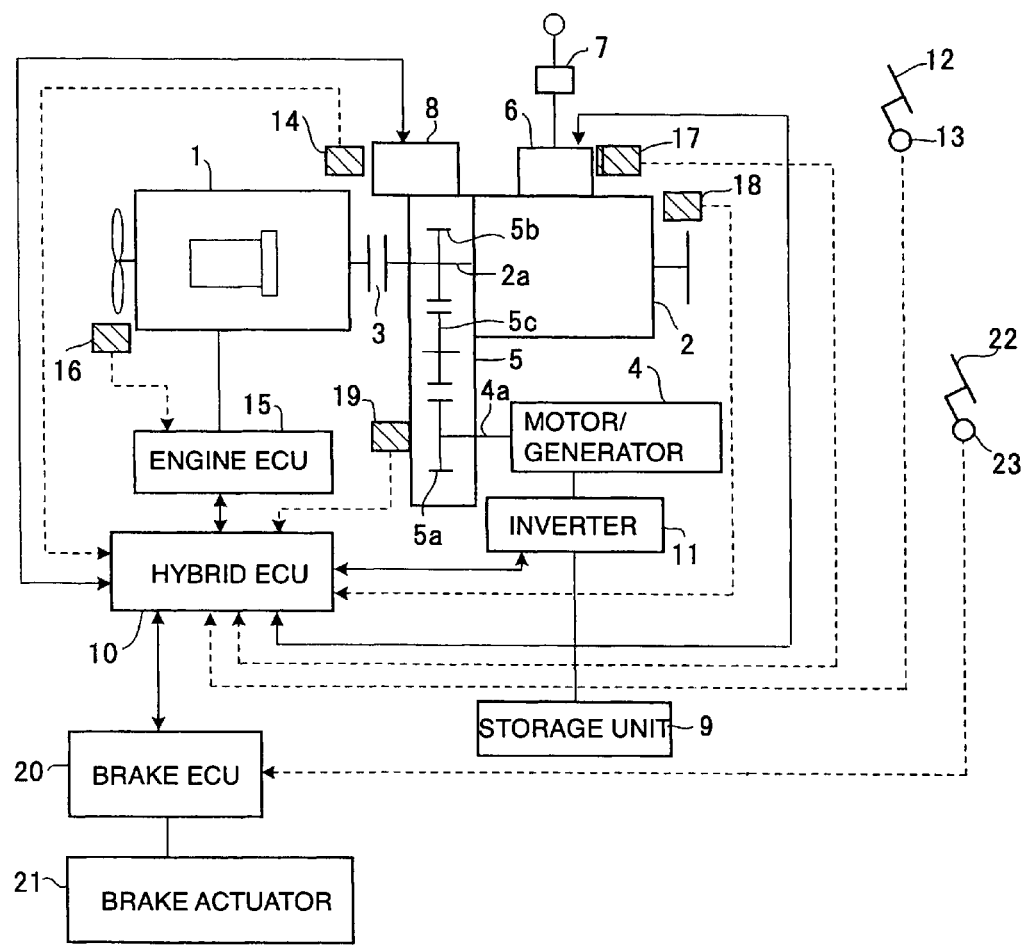
FIG. 1 is a system schematic view showing an embodiment of the present invention.

In FIG. 1, the reference numeral 1 denotes an engine and the reference numeral 2 denotes a gear-type transmission. A friction clutch 3 is interposed between an input shaft of the engine 1 and an input shaft 2a of the transmission 2.

A diesel engine or an engine using Compressed Natural Gas (CNG) as fuel) may be used as the engine 1. The reference numeral 4 denotes a rotating electric machine (motor/generator), which serves as an electric generator and an electric motor. An input/output shaft 4a of the rotating electric machine 4 is coupled to an input shaft 2a of the transmission 2 via a rotation transmission mechanism 5, a gearbox.

The transmission 2 is provided with a control unit 6 to control a gear shift thereof. The control unit 6 is connected to a change lever unit 7 and a hybrid electronic control unit 10 (hybrid ECU). When the change lever unit 7 generates a gearshift command, the transmission 2 is controlled according to a signal from the hybrid ECU 10 to establish the gear position in accordance with the gearshift command. An output shaft 2b of the transmission 2 is connected to a propeller shaft to transmit a driving force to wheels.

The clutch 3 is controlled by the hybrid ECU 10 via a clutch actuator 8 to connect or disconnect power transmission from the engine 1 to the transmission 2 and the gearbox 5 (rotation transmission mechanism).

In order to control an amount of fuel supply to the engine 1, an engine electronic control unit 15 (engine ECU) is provided. The engine ECU 15 controls the amount of fuel supply to the engine 1 at the request of the hybrid ECU 10. The rotational speed of the engine 1 is controlled to coincide with a target rotational speed, and for this purpose, an actual rotational speed of the engine 1 is detected by an engine rotation sensor 16.

A brake actuator 21 for generating braking forces in the wheels is controlled by a brake electronic control unit 20 (brake ECU) based on a regenerative braking force of the rotating electric machine 4, which is information of braking from the hybrid ECU 10 and a depressing amount of a brake pedal 22 (required braking force). In this case, braking forces are generated by operating the rotating electric machine 4 as a power generator at the time of braking a vehicle and the brake actuator 21 is controlled in such a way as to compensate for a shortage of the braking force produced by the regenerative braking force. The reference numeral 23 is a brake sensor for detecting the depressing amount of the brake pedal 22.

As the rotating electric machine 4, an Interior Permanent Magnet (IPM) synchronous motor is used from a viewpoint of high efficiency and reduction in size and weight. The rotating electric machine 4 is connected to a storage element 9 via an inverter 11. In order to regenerate brake energy efficiently in a short time without waste, an electric double layer capacitor is used as the storage element 9. The electric double layer capacitor can provide a required output density despite the limited battery mass of the vehicle.

The inverter 11 operates the rotating electric machine 4 in a motor mode or in a power generating mode at the request of the hybrid ECU 10. In the motor mode, the inverter 11 converts the stored energy (direct current power) of the storage element 9 into the alternating current power for supply to the rotating electric machine 4, and thus, the rotating electric machine 4 generates a driving force as the electric motor. On the other hand, in the power generating mode, the rotating electric machine 4 operates as an electric generator and the inverter 11 converts the power (alternating current power) generated by the rotating electric machine 4 into the direct current power for charge in the storage element 9.

The gearbox 5 is provided with a drive gear 5a coupled to the input/output shaft 4a of the rotating electric machine 4, a driven gear 5b coupled to the input shaft 2a of the transmission 2 and an idler gear 5c interposed therebetween.

When the rotating electric machine 4 is operating as the motor, the rotational speed of the input/output shaft 4a of the rotating electric machine 4 is reduced by the gearbox 5 and transmitted to the input shaft 2a of the transmission 2. On the other hand, when the rotating electric machine 4 is operating as the electric generator, the rotational speed of the input shaft 2a of the transmission 2 is increased by the gearbox 5 and transmitted to the input/output shaft 4a of the rotating electric machine 4.

In order to detect the operating information which is required for the control in the hybrid ECU 10, there are provided an acceleration sensor 13 to detect a depressing amount of an accelerator pedal 12 (a required amount of acceleration), a clutch position sensor 14 to detect a connection/disconnection state of the clutch 3, a gear position sensor 17 to detect a gear position of the transmission 2, a vehicle speed sensor 18 (an output rotation sensor of the transmission 2) to detect a rotational speed at the output side of the transmission 2, and a gear rotation sensor 19 (an input rotation sensor of the transmission 2) to detect a rotational speed of the drive gear 5a which is coupled to the input/output shaft 4a of the rotating electric machine 4 as a rotational speed of the input side of the transmission 2.

In addition to the information obtained from these signals, further, the State Of Charge (refer to SOC) of the storage element 9, and various information obtained from the engine ECU 15, the brake ECU 20, the control unit 6 of the transmission 2 and the inverter 11 are input into the hybrid ECU 10, and the hybrid ECU 10 controls based on these informations the clutch actuator 8, the inverter 11 of the rotating electric machine 4 and the clutch actuator 31 of the second clutch 30, while on the other hand, transmitting an engine operation request to the engine ECU 15, a brake request to the brake ECU 20, and further, a command signal to the control unit 6 of the transmission 2.

Figure 2:
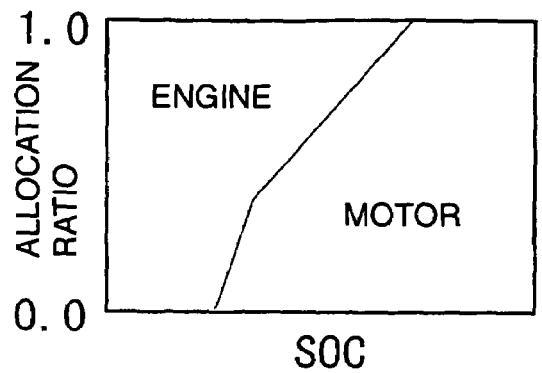
FIG. 2 is a characteristic graph for explaining control contents of the same.

FIG. 2 is a control map stored in the hybrid ECU 10 for setting an allocation ratio of the drive force between an output of the rotating electric machine 4 and an output of the engine 1 according to the SOC of the storage element 9 as a parameter.

The hybrid ECU 10 determines the allocation ratio in accordance with the SOC information of the storage element 9 from the control map and, in order to generate a driver's required output corresponding to a detection signal of the acceleration sensor 13 (the required amount of acceleration), controls the output of the rotating electric machine 4 and the output of the engine 1 based upon the allocation ratio. That is, the hybrid ECU 10 controls the inverter 11 in such a way that the rotating electric machine 4 generates the allocated output and at the same time, transmits to the engine ECU 15 a command signal of a fuel supply amount required for generating an output which is allocated to the engine 1.

Herein, when the allocation ratio of the rotating electric machine 4 is equal to 1 (the output sharing ratio of the engine 1 is equal to zero), the clutch 3 is disconnected and the inverter 11 is controlled in such a way as to obtain all of the required outputs corresponding to the accelerator pedal depressing amount from the rotating electric machine 4. When the allocation ratio of the rotating electric machine 4<1 (the allocation ratio of the engine 1>0), the clutch 3 is connected, and the respective outputs of the engine 1 and the rotating electric machine 4 are summed up, which is inputted to the transmission 2. In this case, the engine ECU 15 and the inverter 11 are controlled so that, as the SOC of the storage element 9 decreases, the output of the rotating electric machine 4 is reduced and the output of the engine 1 is increased. When the allocation ratio of the engine 1 is equal to 1 (the allocation ratio of the rotating electric machine 4 is equal to zero), an engine operation request to the engine ECU 15 is controlled in such a way that all the output equivalent to the accelerator pedal depressing amount is obtained from the engine 1.

The hybrid ECU 10 controls the inverter 11 so that, to the extent that the charge to the storage element 9 is possible (within the range in which power generating is permissible in relation to the SOC) by cooperation control with the brake ECU 20, the regenerative braking force equivalent to the brake operational amount is obtained from the rotating electric machine 4 in a state where the clutch 3 is disconnected. In this case, when a magnitude of the required braking force equivalent to the brake operational amount is not sufficiently produced by the regenerative braking force of the rotating electric machine 4 only, the brake request is transmitted to the brake ECU 20 so that the braking force generated by the brake actuator 21 compensates for the braking force corresponding to the insufficient braking amount.

When the vehicle is not in a braking state and also a charge amount is insufficient based upon the SOC information of the storage element 9, i. e. when the request for the power generation is recognized, in a case where the clutch 3 is connected and an output of the engine 1 has an extra amount for a vehicle travel, the inverter 11 is controlled so that the rotating electric machine 4 is forced to serve as the electric generator to charge the storage element 9.

On the other hand, the hybrid ECU 10 also functions to perform gearshift control at vehicle starting and traveling time. The hybrid ECU 10 causes the rotational speed of the input side of the transmission 2 to quickly converge to a region of the synchronizing rotational speed by operating the rotating electric machine 4 in the power generating mode or in the motor mode, in order to reduce a synchronizing time for gear setting when performing a gear shift of the transmission 2.

Operations of the gearshift control performed by the hybrid ECU 10 will be hereinafter explained in more detail with reference to flow charts.

Figure 3:
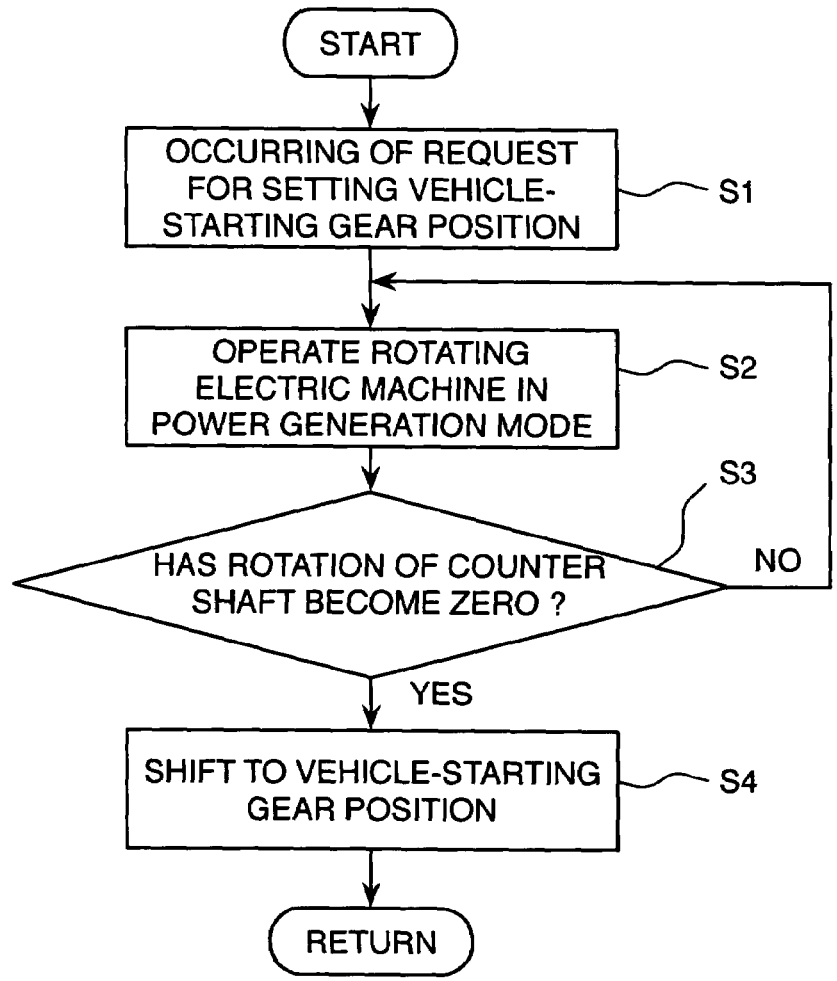
FIG. 3 is a flow chart for explaining control contents of the same.

FIG. 3 is a flow chart for explaining the gearshift control at the vehicle starting time.

When the vehicle is stationary in a state where the engine 1 is running idle and the transmission is in a neutral position, the clutch 3 is first disconnected when the gear setting request to a vehicle-starting gear position occurs based upon a change lever operation (step S1).

In the range in which the charge to the storage element 9 is possible after the disconnection of the clutch 3, the inverter 11 is controlled so that the rotating electric machine 4 operates in the power generating mode (step S2). When the rotational speed of the input side of the transmission 2 is reduced and converged to the region of the synchronizing rotational speed (in this case, since the vehicle is substantially not moving, the rotational speed is generally zero) in accordance with the required gear position for the rotational speed of the output side of the transmission 2, a request for gearshift of the transmission 2 from the neutral position to the required gear position is transmitted to the control unit 6 (step S3 and step S4).

Thereafter, when the accelerator pedal 12 is depressed, the allocation ratio in accordance with the SOC information of the storage element 9 is obtained from the control map (refer to FIG. 2) as described above, and based upon the allocation ratio and the accelerator pedal depressing amount, the connection and disconnection of the clutch 3, as well as the output of the rotating electric machine 4 and the output of the engine 1 are controlled.

With such construction, when the gear setting request to the vehicle-starting gear position occurs at the time of starting a vehicle, since the rotating electric machine 4 operates in the power generating mode after the disconnection of the clutch 3 and the regenerative torque is resistance to the input shaft of the transmission 2, the rotational speed of the input side of the transmission 2 is quickly reduced toward the vicinity of a zero value in the region of the synchronizing rotational speed. When the rotational speed of the input side of the transmission 2 is reduced to the vicinity of a zero value, the transmission 2 is changed over from the neutral position to the vehicle-starting gear position required. As a result, the load to the synchronization mechanism of the transmission 2 caused by the gear shifting at the vehicle start is eliminated, leading to much reduction in the gear shifting time.

Figure 4:
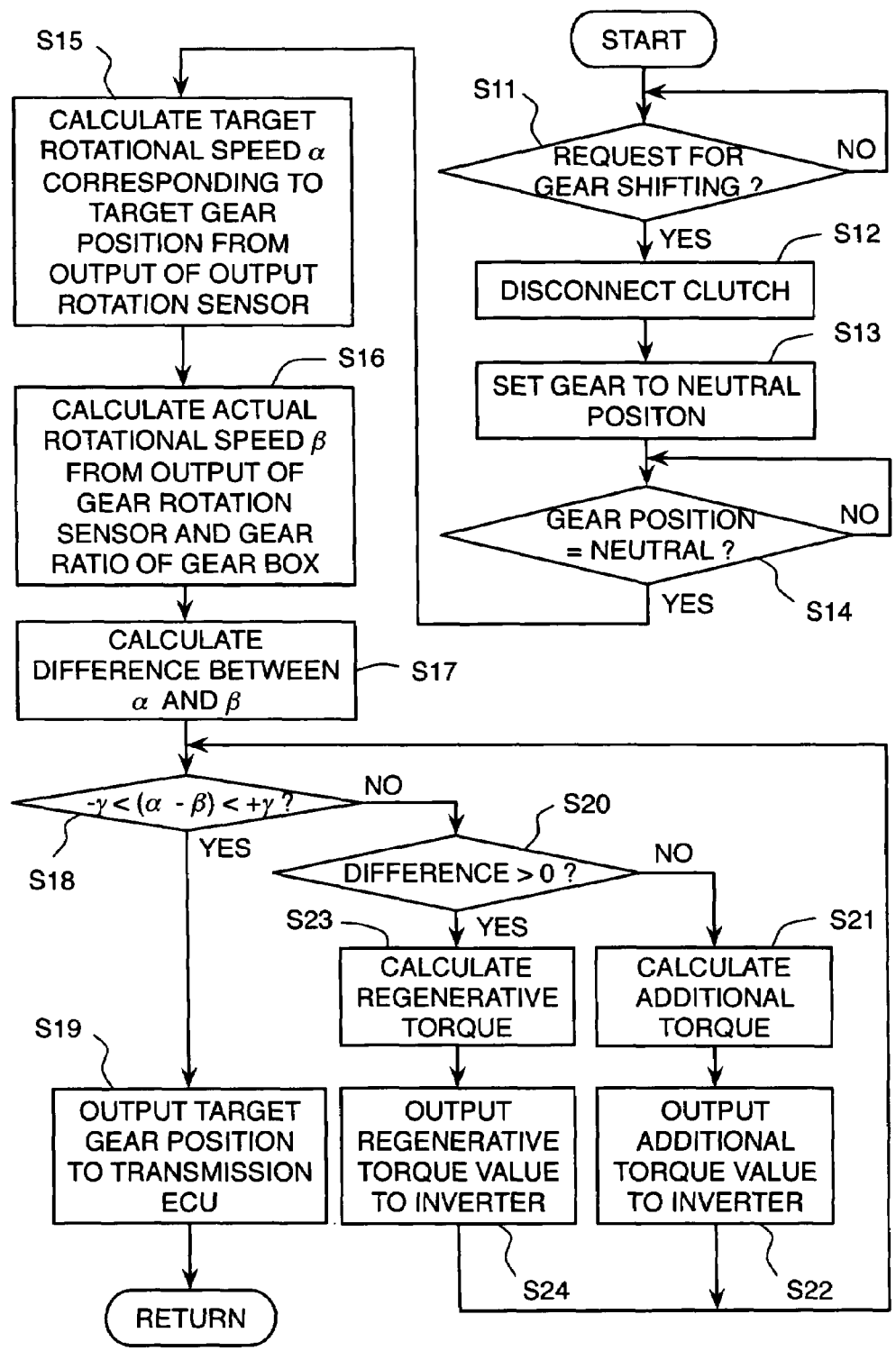
FIG. 4 is a flow chart for explaining control contents of the same.

FIG. 4 is a flow chart for explaining gearshift control during vehicle traveling.

When the gearshift request occurs based upon the change lever operation during the vehicle traveling, the clutch 3 is disconnected, and a request for once setting the transmission to the neutral position is transmitted to the control unit 6 (steps S11 to S13). However, when the vehicle is motor-driven by operating the rotating electric machine 4 in the motor mode, the clutch 3 is in advance disconnected and therefore, the disconnected state of the clutch 3 is maintained as it is.

Next, when the transmission 2 has been changed over to the neutral state (step S14), in a step S15, a target rotational speed $\alpha$ of the input side of the transmission 2 is calculated from the detection signal of the vehicle speed sensor 18 and a gear ratio of the required gear position.

When a gear position is normally shifted up from a low speed position to a high speed position, the target rotational speed $\alpha$ is reduced to a speed lower than the rotational speed of the input shaft side right before the gear shifting, and on the other hand, when the gear position is shifted down from a high speed position to a low speed position, the target rotational speed $\alpha$ increases.

In a step S16, an actual rotational speed $\beta$ of the input side of the transmission 2 is calculated from the detection signal (equivalent to the rotational speed of the rotating electric machine 4 of the gear rotational sensor 19 and a gear ratio of the gear box 5. Next, in a step S17, a rotational speed difference $(\alpha-\beta)$ between the target rotational speed $\alpha$ and the actual rotational speed $\beta$ is calculated.

In a step S18, it is determined whether or not the actual rotational speed $\beta$ is in a region of the synchronizing rotational speed for setting the gear of the transmission, which is obtained by adding a predetermined value $\pm\gamma$ to the target rotational speed $\alpha$. Specifically, it is determined whether or not the rotational speed difference $(\alpha-\beta)$ is within the predetermined value $\pm\gamma$.

When the determination in the step S18 is affirmative, i.e. the actual rotational speed $\beta$ has entered the synchronizing rotational speed region, the process proceeds to a step S19. On the other hand, when the determination in the step S18 is negative, i.e. the actual rotational speed $\beta$ has not entered the synchronizing rotational speed region, the process proceeds to a step S20.

In the step S20, it is determined whether or not the rotational speed difference $(\alpha-\beta)>0$ (the rotational speed difference is positive). When the rotational speed difference is positive, the process proceeds to a step S21, wherein, in order to increase an actual rotational speed of the input side, an additional torque value of the rotating electric machine 4 in the motor mode is calculated in accordance with the rotational speed difference $(\alpha-\beta)$. Next, in a step S22, the additional torque value is commanded to the inverter 11 to operate the rotating electric machine 4 in the motor mode and the process goes back to step S18.

When the determination in the step S20 is negative, i.e. the rotational speed difference is negative, the process proceeds to a step S23 in order to reduce the actual rotational speed $\beta$ of the input side, wherein, a regenerative torque in accordance with the rotational speed difference $(\alpha-\beta)$ is obtained by operating the rotating electric machine 4 in the power generating mode. Next, in a step S24, the regenerative torque value is commanded to the inverter 11 to operate the rotating electric machine 4 in the power generating mode and the process goes back to the step S18.

With the above construction, when a change lever operation for gear shifting is performed, the transmission 2 is once changed over to the neutral position. In this state, when the rotational speed difference satisfies the condition $(\alpha-\beta)>+\gamma$, the rotating electric machine 4 operates as a motor and additional torque value in accordance with the rotational speed difference $(\alpha-\beta)$ is applied to the input side of the transmission 2. As a result, the actual rotational speed $\beta$ of the input side of the transmission 2 is forced to be quickly increased to the target rotational speed $\alpha$ corresponding to the required gear position. In contrast, when the rotational speed difference satisfies the condition $(\alpha-\beta)<-\gamma$, the rotating electric machine 4 operates as an electric generator to generate the regenerative energy in accordance with the rotational speed difference $(\alpha-\beta)$, the actual rotational speed $\beta$ of the input side of the transmission 2 is forced to be quickly reduced to the target rotational speed $\alpha$ corresponding to the required gear position. Therefore, the actual rotational speed $\beta$ of the input side of the transmission 2 converges to the region of the synchronizing rotational speed of the required gear position for a short period of time.

When actual the rotational speed $\beta$ of the input inside enters the region of the synchronizing rotational speed of the required gear position, the process proceeds from the step S18 to the step S19, wherein the transmission 2 is changed over from the neutral position to the requited gear position. As a result, the gear setting in the gear shifting is smoothly performed, allowing much reduction of synchronizing time for the gear setting.

It should be noted that in the above control, when the charging state of the storage element 9 is insufficient, the rotating electric machine 4 is incapable of operating as a motor or when the charging state is excessive, in order to prevent deterioration of the storage element 9 due to overcharging, the rotating electric machine 4 is incapable of operating as an electric generator, and therefore, each control is performed while determining the charging state of the storage element 9, i. e. the SOC.

INDUSTRIAL APPLICABILITY

A gearshift control system for a hybrid vehicle according to the present invention may be applied to a hybrid drive system for various types of vehicles.

The invention claimed is:

1. A gearshift control system for a hybrid-drive electric vehicle, the vehicle comprises an engine having an output shaft, a transmission having an input shaft and an output shaft, the transmission changing and transmitting a rotation of the input shaft to wheels via the output shaft, the transmission having gear positions including a neutral position and selectively applying one of the gear positions according to a gear shift request, a clutch for connecting and disconnecting power transmission between the output shaft of the engine and the input shaft of the transmission, a rotating electric machine connected to the input shaft of the transmission via gears for operating as an electric motor and an electric generator, a storage element for storing an electric power supplied from the rotating electric machine, the system comprising:

determining means for determining whether or not the gear shifting request of the transmission exists;

clutch disconnection means for disconnecting the clutch upon the gear shifting request of the transmission;

neutral position setting means for changing over the gear position of the transmission to the neutral position when the clutch has been disconnected;

mode selecting means for selectively operating the rotating electric machine in a motor mode and in a power generating mode so that a rotational speed of the input shaft of the transmission reaches a region of a synchronizing rotational speed depending on a requested gear position; and gear setting means for setting the gear position of the transmission from the neutral position to the requested gear position, wherein:

the gear positions of the transmission include a vehicle-starting gear position;

the determining means determines if the gear shifting request is a request to the vehicle-starting gear position, and if the request to the vehicle-starting gear position exists in a vehicle stationary state where the engine is running idle, the transmission is in the neutral position, and the clutch is connected; and when the request to the vehicle-starting gear position exists in the vehicle stationary state, the clutch disconnection means disconnects the clutch, the mode selecting means operates the rotating electric machine in the power generating mode to decrease the rotational speed of the input shaft until the rotational speed of the input shaft reaches the region of the synchronizing rotational speed in the vicinity of a zero value after the clutch means disconnects the clutch, and the gear setting means sets the gear position of the transmission from the neutral position to the vehicle-starting gear position when the rotational speed of the input shaft reaches the region of the synchronizing rotational speed in the vicinity of a zero value.

2. The gearshift control system according to claim 1, wherein:

the clutch disconnection means is configured, when the gear shifting request of the transmission has been determined to exist, to disconnect the clutch and maintain the clutch disconnected until gear setting to the requested gear position completes, if the vehicle is traveling by an output of the engine, and to disconnect the clutch and maintain the clutch disconnected even after gear setting to the requested gear position completes, if the vehicle is traveling by an output of the rotating electric machine.

3. The gearshift control system according to claim 1, wherein:

the storage element comprises an electric double layer capacitor.

4. A gearshift control system for a hybrid-drive electric vehicle, the vehicle comprises an engine having an output shaft; a transmission having an input shaft and an output shaft, the transmission changing and transmitting a rotation of the input shaft to wheels via the output shaft, the transmission having gear positions including a neutral position and selectively applying one of the gear positions according to a gear shift request, a clutch for connecting and disconnecting power transmission between the output shaft of the engine and the input shaft of the transmission, a rotating electric machine connected to the input shaft of the transmission via gears for operating as an electric motor and an electric generator, a storage element for storing an electric power supplied from the rotating electric machine, the system comprising:

a programmable controller programmed to:

determine whether or not the gear shifting request of the transmission exists;

disconnect the clutch upon the gear shifting request of the transmission;

change over the gear position of the transmission to the neutral position when the clutch has been disconnected;

selectively operate the rotating electric generator in a motor mode and in a power generating mode so that a rotational speed of the input shaft of the transmission reaches a region of a synchronizing rotational speed depending on a requested gear position; and set the gear position of the transmission from the neutral position to the requested gear position, wherein the gear positions of the transmission include a vehicle-starting gear position; and wherein the controller is further programmed to:

determine if the gear shifting request is a request to the vehicle-starting gear position, and if the request to the vehicle-starting gear position exists in a vehicle stationary state where the engine is running idle, the transmission is in the neutral position, and the clutch is connected; and when the request to the vehicle-starting gear position exists in the vehicle stationary state, disconnect the clutch, operate the rotating electric machine in the power generating mode to decrease the rotational speed of the input shaft until the rotational speed of the input shaft reaches the region of the synchronizing rotational speed in the vicinity of a zero value after the clutch is disconnected, and set the gear position of the transmission from the neutral position to the vehicle-starting gear position when the rotational speed of the input shaft reaches the region of the synchronizing rotational speed in the vicinity of a zero value.

5. A gearshift control method for a hybrid-drive electric vehicle, the vehicle comprises an engine having an output shaft; a transmission having an input shaft and an output shaft, the transmission changing and transmitting a rotation of the input shaft to wheels via the output shaft, the transmission having gear positions including a neutral position and selectively applying one of the gear positions according to a gear shift request, a clutch for connecting and disconnecting power transmission between the output shaft of the engine and the input shaft of the transmission, a rotating electric machine connected to the input shaft of the transmission via gears for operating as an electric motor and an electric generator, a storage element for storing an electric power supplied from the rotating electric machine, the method comprising:

determining whether or not the gear shifting request of the transmission exists;

disconnecting the clutch upon the gear shifting request of the transmission;

changing over the gear position of the transmission to the neutral position when the clutch has been disconnected;

selectively operating the rotating electric generator in a motor mode and in a power generating mode so that a rotational speed of the input shaft of the transmission reaches a region of a synchronizing rotational speed depending on a requested gear position; and setting the gear position of the transmission from the neutral position to the requested gear position, wherein the gear positions of the transmission include a vehicle-starting gear position; and wherein the method further comprises:

determining if the gear shifting request is a request to the vehicle-starting gear position, and if the request to the vehicle-starting gear position exists in a vehicle stationary state where the engine is running idle, the transmission is in the neutral position, and the clutch is connected; and when the request to the vehicle-starting gear position exists in the vehicle stationary state, disconnecting the clutch, operating the rotating electric machine in the power generating mode to decrease the rotational speed of the input shaft until the rotational speed of the input shaft reaches the region of the synchronizing rotational speed in the vicinity of a zero value after the clutch is disconnected, and setting the gear position of the transmission from the neutral position to the vehicle-starting gear position when the rotational speed of the input shaft reaches the region of the synchronizing rotational speed in the vicinity of a zero value.

\* \* \* \* \*